United States Patent [19]

Bement et al.

[11] Patent Number: 5,676,303
[45] Date of Patent: Oct. 14, 1997

[54] EXPLOSIVE SPOT JOINING OF METALS

[75] Inventors: Laurence J. Bement, Newport News; Ronnie B. Perry, Hampton, both of Va.

[73] Assignee: The United States of America as represented by the Administrator of the National Aeronautics and Space Administration, Washington, D.C.

[21] Appl. No.: 637,335

[22] Filed: Apr. 4, 1996

[51] Int. Cl.[6] .................................................. B23K 20/08
[52] U.S. Cl. ............................ 228/107; 228/215; 228/2.5
[58] Field of Search .................................. 228/107–109, 228/214, 215, 2.5; 29/421.2

[56] References Cited

U.S. PATENT DOCUMENTS 5,064,111  11/1991  Bement et al. ........................ 228/107

Primary Examiner—Samuel M. Heinrich
Attorney, Agent, or Firm—Kimberly A. Chasteen

[57] ABSTRACT

The invention is an apparatus and method for wire splicing using an explosive joining process. The apparatus consists of a prebend, U-shaped strap of metal that slides over prepositioned wires. A standoff means separates the wires from the strap before joining. An adhesive means holds two ribbon explosives in position centered over the U-shaped strap. A detonating means connects to the ribbon explosives. The process involves spreading strands of each wire to be joined into a flat plane. The process then requires alternating each strand in alignment to form a mesh-like arrangement with an overlapped area. The strap slides over the strands of the wires, and the standoff means is positioned between the two surfaces. The detonating means then initiates the ribbon explosives that drive the strap to accomplish a high velocity, angular collision between the mating surfaces. This collision creates surface melts and collision bonding resulting in electron-sharing linkups.

30 Claims, 2 Drawing Sheets

EXPLOSIVE SPOT JOINING OF METALS

ORIGIN OF THE INVENTION

The invention described herein was made in the performance of work under a NASA Contract and is subject to the provisions of Section 305 of the National Aeronautics and Space Act of 1958, as amended, Public Law 85-568(72 Stat. 435; 42 USC 2457).

BACKGROUND OF THE INVENTION

1. Field of the Invention

This invention generally relates to metal fusion bonding using explosive energy. More specifically, the invention is an apparatus and method for explosively joining, i.e. welding and cladding, metals of similar or dissimilar composition in small-areas or "spots," whereby a sealing bulkhead prevents contamination of the surfaces of the metals to be joined.

2. Description of the Related Art

Since the 1960s, metal bond fusion using explosive energy, or "explosive joining," has been developed to provide an efficient and versatile means of bonding metals which are otherwise difficult or impossible to weld and/or clad by conventional, non-explosive means. In particular, explosive joining is uniquely and especially suitable for joining metals of dissimilar metallurgical composition whose melting points are incompatible with conventional welding; for joining thin sheets of metal or metal wiring which might be damaged by the heat of conventional welding; for joining metals in areas made inaccessible by bulky conventional welding equipment, e.g. the assembly of structures in space; and for joining metals, e.g. titanium or aluminum, which require time and a high degree of skill to weld due to the unique physical properties of the metals.

The explosive joining process produces a high velocity, angular collision between the surfaces of the metal components to be joined which causes the formation of interatomic, electron-sharing linkups at the point of contact between the metal components. Upon detonation of the explosives, the metal components to be joined are impelled together with sufficient force to produce metallurgical bonds which are impossible to achieve by any other known process. This process is comparatively simple and can be performed by relatively unskilled personnel. Consequently, explosive joining is particularly useful in its unique applications and relative simplicity.

Previous methods of explosive joining have addressed incorporating an inverted "V" standoff interface on one or a plurality of metal components to be joined, in order to maximize bonding efficiency. For example, U.S. Pat. No. 4,708,280 by Bement describes an inverted "V" standoff, machined into the outer surface of either or both of the metal tubes to be joined, as an alternate to the preferred embodiment. Hence, the Bement patent reveals art which purports to limit use to joining two metal tubes.

Previous methods of explosive joining also have addressed problems associated with degradation of the bonding surface, i.e. the surface bond area, between the metal components to be joined. Such degradation typically results after the initial detonation of the explosives when very-fine, high-density particles contained in the explosives invade the standoff space between the metal components to be joined before the explosive energy has propagated through the metal components to initiate the angular collisions between the metal components. For example, U.S. Pat. No. 5,318,213 by Strickland et al. addresses one aspect of surface degradation, i.e. "air burning," by shielding the metal components to be joined in an "envelope made of deformable material." Typically, air burning is manifested when very-fine, high-density solid particles from the explosives, e.g. carbon, which became airborne after the initial detonation, ignite. Thus, the Strickland patent reveals art which embodies a means of minimizing surface bond degradation caused by very-fine, airborne particles which ignite in the air space between the metal components to be joined.

SUMMARY OF THE INVENTION

The present invention is an apparatus and process for explosively joining a plurality of metal components of similar or dissimilar composition.

An object of the present invention is to provide a means of explosively joining a plurality of metal components, wherein an inverted "V" standoff interface is machined onto or formed into a plurality of metal components to be joined, to maximize bonding efficiency.

Another object of the present invention is to provide a means of explosively joining a plurality of metal components, wherein a sealing bulkhead is employed, to minimize contamination of the bonding surface, and, hence, a degradation in the size and strength of the bond area.

A further object of the present invention is to provide a means of explosively joining a plurality of metal components which minimizes the amount of explosive required.

Still another object of the present invention is to provide a means of explosively joining a plurality of metal components which reduces damaging pressure waves, noise nuisance, and damage to surrounding structures.

The present invention attains the foregoing and additional objects by providing an apparatus and process for joining metal components using explosive energy. While this process is specifically applicable to explosive cladding and welding of metals, its application is not limited to those two embodiments. Similarly, this process is particularly useful for joining metal components in small areas or "spots;" however, its application is not limited to explosive "spot" welding. A "spot" is therein defined as a bond area that is at least twice the thickness of the thinnest metal component being joined, in any direction of the surface bonded.

The apparatus consists of a plurality of small metal components to be joined and ribbon explosives. A standoff means, consisting of an inverted "V" standoff interface machined onto or formed into a plurality of the metal components, separates the metal bonding surfaces prior to detonation and is designed to provide maximum joining efficiency. A sealing means protects the integrity of the bonding surface using a sealing bulkhead which prevents surface contamination by high-velocity particles released by the detonation. An adhesive means holds a ribbon explosive in position on each metal component. A detonating means initiates the ribbon explosives.

The process involves placing the metal components to be joined in any desired orientation. When the metal components are joined with their axes generally perpendicular to each another, a tab joint is created. When the metal components are joined along the same axes, i.e. parallel, to each other, a splice joint is created.

For a splice joint, an inverted "V" standoff is machined onto or formed into a "host" metal component at any desired location. A "host" metal component is herein defined as a metal component into which either an inverted "V" standoff, or a sealing bulkhead, or a combination of the two, is machined or formed. The tip of the inverted "V" is oriented along the same axis of the "host" metal component and generally perpendicular to the axis of the other metal components. A sealing bulkhead is also machined onto or formed into the same "host" metal component so that it is oriented generally perpendicular to the "host" metal component and therefore along the same axis as the other metal components. The sealing bulkhead is located nearest to the point of initiation of the explosives so that the explosive energy impacts the sealing bulkhead before impacting other portions of the metal components to be joined.

For a tab joint, an inverted "V" standoff is machined onto or formed into a "host" metal component at any desired location. The tip of the "V" is oriented along the same axis as the "host" metal component. A sealing bulkhead is machined onto the "host" metal component so that the sealing bulkhead is located generally perpendicular to the axis of the "host." The sealing bulkhead is located nearest to the point of initiation of the explosives so that the explosive energy impacts the sealing bulkhead before impacting other portions of the metal components to be joined.

For either joint type, ribbon explosives, or, alternately, unconfined strips of explosives, are fashioned and bonded to the outermost surface of the metal components to be joined. An adhesive means, e.g. double-backed tape, affixes the ribbon explosives, or, alternately, unconfined strips of explosives, to the metal components. A detonating means is mated to the ribbon explosives so that the propagation direction of the detonation initially impacts the sealing bulkhead. The detonating means is then ignited to effect an explosive joining of the metal components.

DETAILED DESCRIPTION OF THE PREFERRED EMBODIMENT

Figure 4:
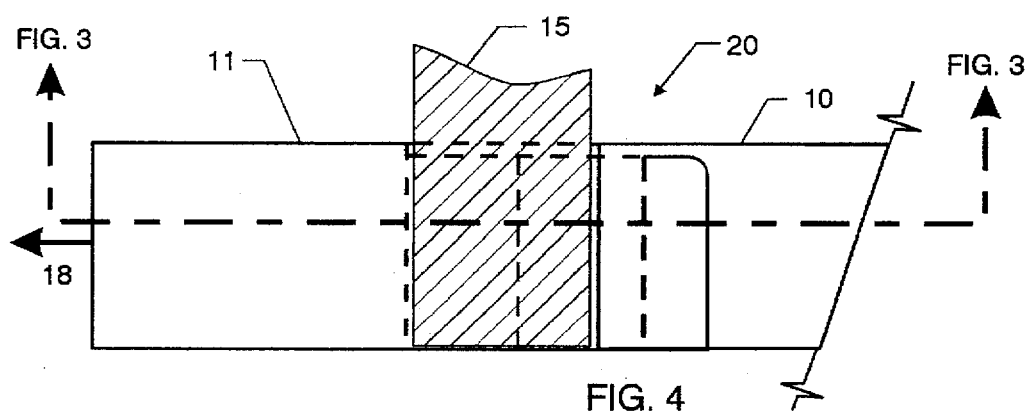
FIG. 4 is a plan view of the splice jointing process comprising two metal components whose common axes are parallel to one another.
Figure 8:
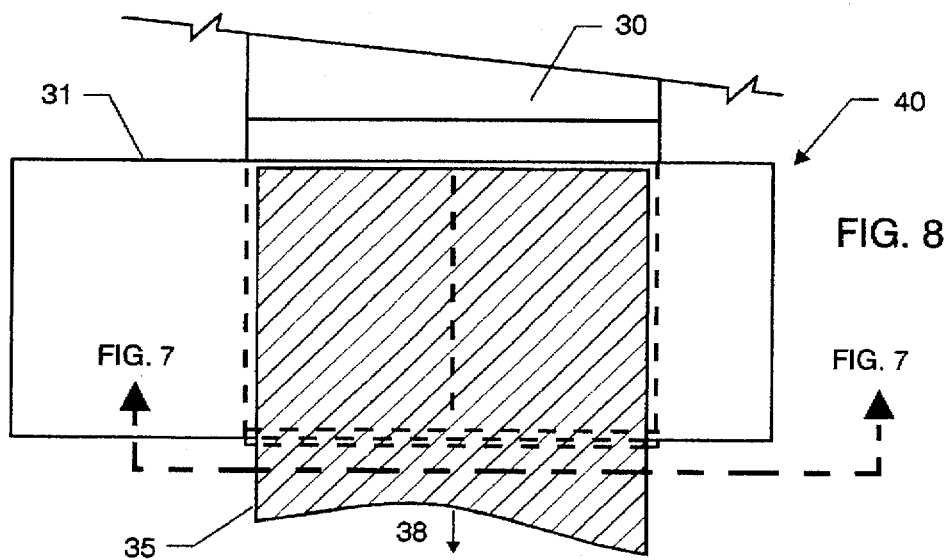
FIG. 8 is a plan view of the tab jointing process comprising two metal components whose axes are generally perpendicular to one another.

The present invention involves physical processes for explosively joining a plurality of similar or dissimilar metal components to form a splice joint 20 or a tab joint 40, depicted in plan view in FIGS. 4 and 8, respectively.

Figure 1:
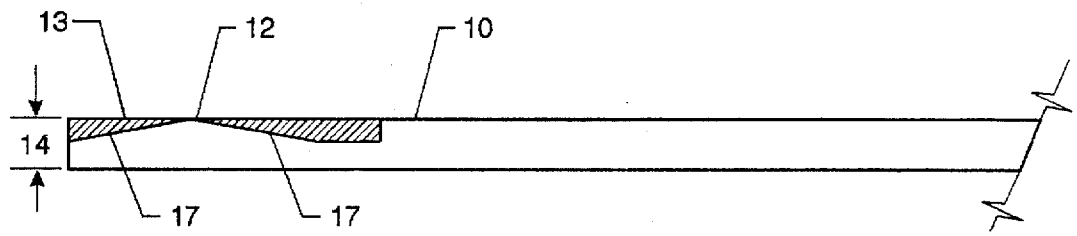
FIG. 1 is a cross-sectional view of a "host" metal component for a splice joint with an inverted "V" interface detail.
Figure 2:
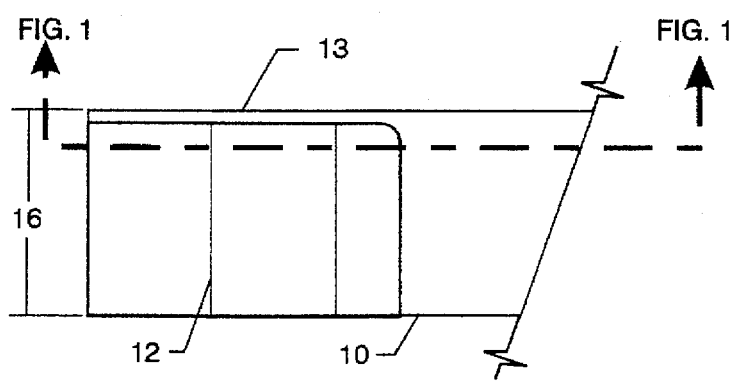
FIG. 2 is a plan view of a "host" metal component for a splice joint with a sealing bulkhead detail.

Referring to FIGS. 1 and 2, which, respectively, depict cross-sectional and plan views of a "host" metal component 10 for a splice joint 20, a preferred embodiment of a "host" metal component 10 comprises a strip of metal approximately 0.125 inches in thickness 14 and 0.50 in. in width 16. An inverted "V" interface 12 is machined or formed onto the "host" metal component 10 as a standoff means to separate the "host" metal component 10 from the receiving metal component 11, to maximize the efficiency of the high velocity, angular collision necessary to effect the explosive joint. The inverted "V" interface 12 should be machined or formed onto the "host" metal component 10 at an approximate angle between 3 and 10 degrees from the horizontal with the tip of the inverted "V" interface 12 oriented generally perpendicular to the axis of the "host" metal component 10. The length of the inverted "V" interface 12 should correspond to the desired splice joint 20 length, with each leg 17 of the inverted "V" interface 12 approximately one-half the total length of the desired splice joint 20 length. A sealing bulkhead 13 is also machined or formed onto the "host" metal component 10 to provide a sealing means, to minimize contamination of the bonded surface between the "host" metal component 10 and the receiving metal component 11. The sealing bulkhead 13 should be oriented in the common axis 18 of the "host" metal component 10. The sealing bulkhead 13 is typically 0.02 in. in thickness but could be any practical thickness. The length of the sealing bulkhead 13 should extend slightly beyond each leg 17 of the inverted "V" interface 12.

Figure 3:
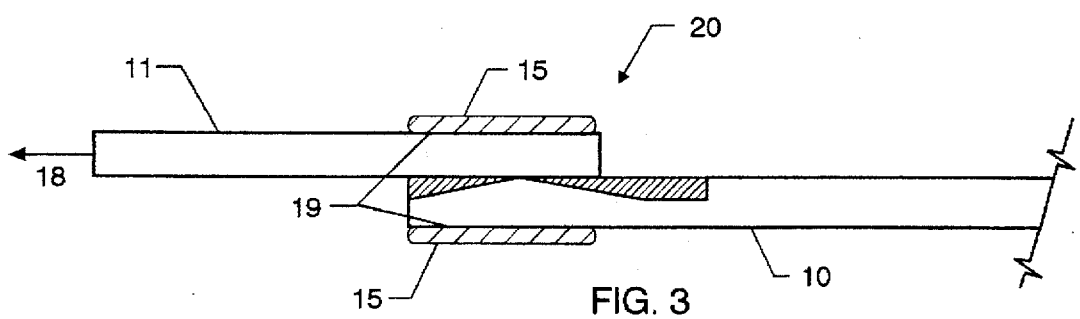
FIG. 3 is a cross-sectional view of the splice jointing process comprising two metal components whose common axes are parallel to one another.

As shown in the completed assembly of FIGS. 3 and 4, a preferred embodiment of the present invention for a splice joint 20 comprises a "host" metal component 10 and a receiving metal component 11 which are placed one atop the other along their common axis 18. The orientation of the "host" metal component 10 and the receiving metal component 11 should be such that the tip of the inverted "V" interface 12 is positioned along the receiving metal component 11 at the midpoint of the desired splice joint 20 location.

Figure 5:
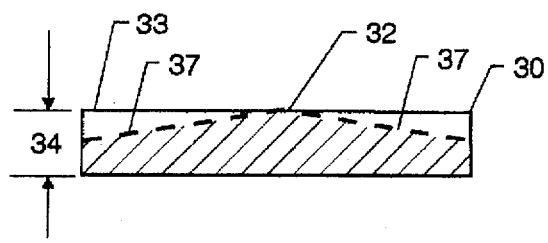
FIG. 5 is a cross-sectional view of a "host" metal component for a tab joint with an inverted "V" interface detail.
Figure 6:
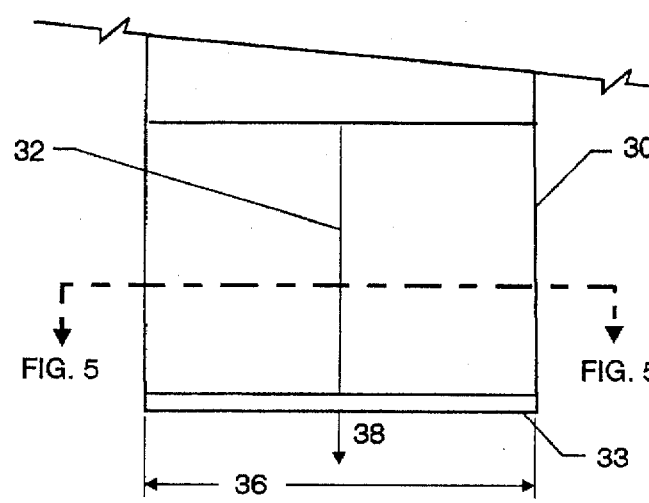
FIG. 6 is a plan view of a "host" metal component for a tab joint with a sealing joint detail.

Referring to FIGS. 5 and 6, which, respectively, depict cross-sectional and plan views of a "host" metal component 30 for a tab joint 40. As for the splice joint described above, a preferred embodiment of a "host" metal component 30 comprises a strip of metal approximately 0.125 inches in thickness 34 and 0.50 in. in width 36. An inverted "V" interface 32 is machined or formed onto the "host" metal component 30 as a standoff means to separate the "host" metal component 30 from the receiving metal component 31, to maximize the efficiency of the high velocity, angular collision necessary to effect the explosive joint. The inverted "V" interface 32 should be machined or formed onto the "host" metal component 30 at an approximate angle between 3 and 10 degrees from the horizontal with the tip of the inverted "V" interface 32 oriented generally along the axis 38 of the "host" metal component 30. The length of the inverted "V" interface 32 should correspond to the bond length desired, with each leg 37 of the inverted "V" interface 32 approximately one-half the total length of the desired bond length. A sealing bulkhead 33 is also machined or formed onto the "host" metal component 30 to provide a sealing means, to minimize contamination of the bonded surface between the "host" metal component 30 and the receiving metal component 31. The sealing bulkhead 33 should be oriented generally perpendicular to the axis 38 of the "host" metal component 30. The sealing bulkhead 33 is typically 0.02 in. in thickness but could be any practical thickness. The length of the sealing bulkhead 33 should be equivalent to the width of the "host" metal component 36.

Figure 7:
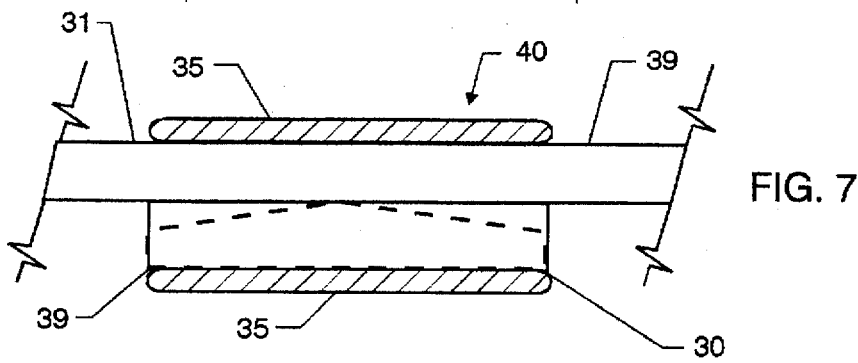
FIG. 7 is a cross-sectional view of the tab jointing process comprising two metal components whose axes are generally perpendicular to one another.

As shown in the completed assembly of FIGS. 7 and 8, a preferred embodiment of the present invention for a tab joint comprises a "host" metal component 30 and a receiving metal component 31 which are placed one atop the other and generally perpendicular to one another. The orientation of the "host" metal component 30 and the receiving metal component 31 should be such that the tip of the inverted "V" interface 32 is positioned along the receiving metal component 31 at the midpoint of the desired tab joint 40 location.

Ribbon explosives 35 should be cut to an appropriate length; bonded to the outer, i.e. non-bonding, surface of the "host" metal component 30 and the outer surface of the receiving metal component 31; and finally mated to a detonating means (not shown). An appropriate length of ribbon explosives 35 extends as necessary to allow for assembly with the detonating means (not shown). The orientation of the ribbon explosives 35 should be generally along the axis 38 of the "host" metal component 30, to give the sealing bulkhead 33 greatest effect. The width of the ribbon explosives 35 should approximately equal the length of the inverted "V" interface 12. To bond the ribbon explosives 35 to the "host" metal component 30 and the receiving metal component 31, first an adhesive means 39, such as double-back tape, is positioned and attached to the outer surface over the desired bonding area. The ribbon explosive 35 is then centered on and pressed into the adhesive means 39 to effect a bond. Preferably, ribbon explosives 35 are placed on both the "host" metal component 30 and the receiving metal component 31 and n initiated simultaneously to generate symmetrically opposed forces and to minimize or eliminate offsetting forces generated during explosion of the ribbon explosives 35. An alternative embodiment, however, would position the ribbon explosive on only the "host" metal component 30 and then placing the receiving metal component 31 upon a shock absorbing means such as an anvil to maximize joining efficiency by reducing deformations.

The present invention further comprises a detonating means (not shown) such as a blasting cap mated to the ribbon explosives 15,35. The detonating means (not shown) initiates the ribbon explosives 15,35 which impel the "host" metal component 10,30 and the receiving metal component 11,31 together under great energy to effect a bonded splice joint 20 or tab joint 40. Electric blasting caps may be used to initiate the explosive and require approximately 0.1 joule. Such blasting caps must use electrical shielding, grounding, and fail-safe firing systems.

Alternatively, a number of aerospace approaches for initiation, such as mechanically actuated percussion primers, explosive transfer lines, or lasers may serve as a detonating means.

While specific embodiments of the invention have been described herein, they are only exemplary of the novel feature of the invention and are not exhaustive.

Many variations and modifications of these specific examples will be readily apparent to those skilled in the art in light of the above teachings without departing from the scope of the appended claims. This invention may be practiced otherwise than as specifically described herein.

What is claimed as new and desired to be secured by Letters Patent of the United States is:

1. An apparatus for explosively joining a plurality of metal components at a bonding surface, comprising:
    (a) a sealing means to protect the bonding surface of the metal components from contamination by high-velocity particles created by detonating explosives;
    (b) a standoff means separating the metal components from one another;
    (c) a ribbon explosive positioned on at least one of the metal components;
    (d) an adhesive means holding the ribbon explosive in any desired position on at least one of the metal components; and
    (e) a detonating means initiating the ribbon explosives.

2. An apparatus for explosively joining a plurality of metal components as in claim 1 wherein the composition of the metal components is metallurgically dissimilar.

3. An apparatus for explosively joining a plurality of metal components as in claim 1 wherein the composition of the metal components is metallurgically similar.

4. An apparatus for explosively joining a plurality of metal components as in claim 1 wherein the metal components are positioned along a common axis to form a splice joint.

5. An apparatus for explosively joining a plurality of metal components as in claim 1 wherein the metal components are positioned perpendicular to one another to form a tab joint.

6. An apparatus for explosively joining a plurality of metal components as in claim 1 wherein the standoff means consists of an inverted "V" interface machined onto or formed into one or more host metal components.

7. An apparatus for explosively joining a plurality of metal components as in claim 6 wherein the inverted "V" interface is machined onto or formed into at least one of the host metal components at an angle between 3 and 10 degrees from horizontal.

8. An apparatus for explosively joining a plurality of metal components as in claim 7 wherein the inverted "V" interface is machined or formed along a common axis as with the host metal component, to form a splice joint.

9. An apparatus for explosively joining a plurality of metal components as in claim 7 wherein the inverted "V" interface is machined generally perpendicular to the axis of the host metal component, to form a tab joint.

10. An apparatus for explosively joining a plurality of metal components as in claim 1 wherein the sealing means consists of a bulkhead machined onto or formed into at least one of the host metal components.

11. An apparatus for explosively joining a plurality of metal components as in claim 10 wherein the sealing bulkhead is machined or formed along a common axis with at least one of the host metal components, at a point nearest to a point whence initiation of the explosives occurs, to form a splice joint.

12. An apparatus for explosively joining a plurality of metal components as in claim 10 wherein the sealing bulkhead is machined or formed generally perpendicular to the axis of the host component, at a point nearest to a point whence initiation of the explosives occurs, to form a tab joint.

13. An apparatus for explosively joining a plurality of metal components as in claim 1 wherein joining of the metal components is confined to a small area or spot.

14. An apparatus for explosively joining a plurality of metal components as in claim 13 wherein joining of the metal components is confined to a small area or spot which has a minimum bonded width of 0.10 inches.

15. An apparatus for explosively joining a plurality of metal components as in claim 13 wherein joining of the metal components is confined to a small area or spot which has an explosive footprint area to size of bond area ratio no greater than 8.

16. A process for explosively joining a plurality of metal components at a bonding surface, comprising:

(a) machining or forming at least one metal component at intended areas to be joined, to provide a standoff means;

(b) machining or forming at least one metal component at intended areas to be joined, to provide a sealing means;

(c) placing ribbon explosives on at least one metal component at intended areas to be joined;

(d) bonding ribbon explosives to at least one metal component with an adhesive means;

(e) mating the ribbon explosives to a detonating means so that the ribbon explosives can be properly initiated;

(f) positioning the metal components over one another at the intended joining area;

(g) initiating the ribbon explosives with the detonating means to allow the ribbon explosives to drive the metal components together to effect a bonded explosive joint.

17. A process for explosively joining a plurality of metal components as in claim 16 wherein the composition of the metal components is metallurgically dissimilar.

18. A process for explosively joining a plurality of metal components as in claim 16 wherein the composition of the metal components is metallurgically similar.

19. A process for explosively joining a plurality of metal components as in claim 16 wherein the metal components are positioned along a common axis in step (f), to form a splice joint.

20. A process for explosively joining a plurality of metal components as in claim 16 wherein the metal components are positioned generally perpendicular to one another in step (f), to form a tab joint.

21. A process for explosively joining a plurality of metal components as in claim 16 wherein the standoff means in step (a) consists of an inverted "V" interface.

22. A process for explosively joining a plurality of metal components as in claim 21 wherein the inverted "V" interface is machined onto or formed into at least one host metal components at an angle between 3 and 10 degrees from horizontal.

23. A process for explosively joining a plurality of metal components as in claim 22 wherein the inverted "V" interface is machined or formed along a common axis as the host metal component, to form a splice joint.

24. A process for explosively joining a plurality of metal components as in claim 22 wherein the inverted "V" interface is machined or formed generally perpendicular to the axis of the host metal component, to form a tab joint.

25. A process for explosively joining a plurality of metal components as in claim 16 wherein the sealing means in step (b) consists of bulkhead.

26. A process for explosively joining a plurality of metal components as in claim 25 wherein the sealing bulkhead is machined or formed along a common axis as the host metal components, at a point nearest to a point whence initiation of the explosives occurs, to form a splice joint.

27. A process for explosively joining a plurality of metal components as in claim 25 wherein the sealing bulkhead is machined or formed generally perpendicular to the axis of the host metal components, at a point nearest to a point whence initiation of the explosives occurs, to form a tab joint.

28. A process for explosively joining a plurality of metal components as in claim 16 wherein joining of the metal components is confined to a small area or spot.

29. A process for explosively joining a plurality of metal components as in claim 28 wherein joining of the metal components is confined to a small area or spot which has a minimum bonded width of 0.10 inches.

30. A process for explosively joining a plurality of metal components as in claim 28 wherein joining of the metal components is confined to a small area or spot which has an explosive footprint area to size of bond area ratio no greater than 8.

* * * * *